(12) United States Patent
Calame

(10) Patent No.: US 8,892,398 B2
(45) Date of Patent: Nov. 18, 2014

(54) OPTICAL MEASUREMENT METHOD AND APPARATUS

(75) Inventor: Fabrice Calame, Villars-Ste-Croix (CH)

(73) Assignee: Tesa SA, Renens (CH)

( * ) Notice: Subject to any disclaimer, the term of this patent is extended or adjusted under 35 U.S.C. 154(b) by 379 days.

(21) Appl. No.: 13/073,229

(22) Filed: Mar. 28, 2011

(65) Prior Publication Data

US 2011/0264406 A1  Oct. 27, 2011

(30) Foreign Application Priority Data

Apr. 21, 2010  (EP) .................................... 10160538

(51) Int. Cl.
*G01B 5/02* (2006.01)
*G01B 11/24* (2006.01)
*G01B 11/08* (2006.01)

(52) U.S. Cl.
CPC ............ *G01B 11/2433* (2013.01); *G01B 11/08* (2013.01)
USPC ............................ 702/159; 702/155; 356/496

(58) Field of Classification Search
CPC .................. G05B 19/4065; G05B 2219/37227; G05B 2219/37246
USPC .......... 702/155, 159; 356/496, 512, 521, 638, 356/385
See application file for complete search history.

(56) References Cited

U.S. PATENT DOCUMENTS

| 3,749,500 A | | 7/1973 | Carlson et al. | |
|---|---|---|---|---|
| 4,747,689 A | * | 5/1988 | Aldred | 356/638 |
| 4,854,707 A | | 8/1989 | Ring et al. | |
| 5,335,183 A | * | 8/1994 | Tsuboi et al. | 700/195 |
| 5,383,021 A | * | 1/1995 | Hanna | 356/634 |
| 5,825,017 A | * | 10/1998 | Pryor | 250/208.1 |
| 6,161,055 A | | 12/2000 | Pryor | |
| 6,781,703 B1 | * | 8/2004 | Southwood | 356/602 |

(Continued)

FOREIGN PATENT DOCUMENTS

| EP | 0 507 566 | 10/1992 |
|---|---|---|
| WO | 93/23820 | 11/1993 |
| WO | 2009/022452 A1 | 2/2009 |
| WO | WO 2009022452 A1 * | 2/2009 |

OTHER PUBLICATIONS

Extended European Search Report issued in corresponding European Patent Application No. 10160538.4 on Oct. 18, 2010.

*Primary Examiner* — John Breene
*Assistant Examiner* — Stephanie Bloss
(74) *Attorney, Agent, or Firm* — Maschoff Brennan

(57) ABSTRACT

An optical measurement apparatus, comprising a reference support on which are mounted a fixed headstock and a movable tailstock opposed to the fixed headstock and movable in order to maintain a piece to be measured between headstock and tailstock, and a mobile carriage movable along the linear axis, the carriage carrying a light source for directing a beam of collimated light across the x axis to be interrupted by the piece under measurement, the carriage further carrying an optical detector aligned with the light source and arranged to receive the residual light of the beam of collimated light that has not been interrupted by the piece under measurement. The measuring apparatus has a automatic measure mode triggered by a button on the apparatus, that is arranged to automatically guess the features of a workpiece and/or recognize workpieces for which a measurement program is available.

20 Claims, 8 Drawing Sheets

(56) References Cited

U.S. PATENT DOCUMENTS

| | | |
|---|---|---|
| 6,816,609 B1 | 11/2004 | Shimizu et al. |
| 2005/0078322 A1* | 4/2005 | Pirinoli .......................... 356/638 |
| 2005/0208878 A1 | 9/2005 | Weiss |
| 2007/0091174 A1 | 4/2007 | Kochi et al. |
| 2008/0133173 A1* | 6/2008 | Chang et al. .................. 702/155 |
| 2009/0103113 A1* | 4/2009 | Nygaard et al. ............... 356/640 |
| 2010/0157311 A1* | 6/2010 | Hayashi et al. ............... 356/496 |
| 2010/0269231 A1* | 10/2010 | Hua ................................. 850/1 |

\* cited by examiner

US 8,892,398 B2

OPTICAL MEASUREMENT METHOD AND APPARATUS

CROSS-REFERENCE TO RELATED APPLICATIONS

This application claims priority under Title 35 U.S.C. §119(a)-(d) or (f) of EP 10160538.4, filed 21 Apr. 2010, the contents of which are hereby incorporated herein by reference in its entirety.

FIELD OF THE INVENTION

The present invention concerns an optical measuring apparatus for dimensional measurement of a wide range of components, and in particular, but not exclusively, work-pieces machined for example on a lathe or small work-pieces having a rotation axis or piece with convex forms.

DESCRIPTION OF RELATED ART

It is known in the art to obtain dimensional measurements by measuring the shadow of work-piece obtained by a projection of a beam of light. Even if this technique is useful also in many contexts, it lends itself especially well to the measurement of pieces presenting a rotation axis and presenting convex forms; in this case all the dimensions can be obtained from one or more profile obtained by shadow projection.

Optical profile-measurement is an attractive technique to measure work-pieces for production control or measurement in difficult environments, because it is fast and efficient, does not involve physical contact, and can be adapted to many different profiles and shapes, without requiring a large assortment of tools or probes. Profile-measuring machines are often equipped with classic headstock and tailstock carrying two opposed centres, or a mandrel, and can thus accommodate most lathe-machined pieces without special jigs or fixtures.

EP0507566 discloses a measuring apparatus in including a piece holder for maintaining a work-piece between two centres and translating the piece relative to an optical measuring system having a light source and a photo-detector, for measuring the projected shadow of the work-piece.

U.S. Pat. No. 4,854,707 describes a profile-measurement device in which a work-piece is held between two centres, and a sliding optical stage measures the profile of the piece's shadow.

These measuring devices, however, present a series of limitations. In many cases, they are relatively heavy machines, requiring a permanently fixed installation and occupying a large floor area, little suitable to small and medium workshops. These machines are also complex to use and maintain in a state of calibration and, therefore, do not lend themselves to casual use.

Many of the profile-measuring machines known in the art deliver high-precision measurements in clean laboratory conditions, but their performance quickly degrade in a work environment, where they are exposed to dirt, dust, aerosols, vibrations and temperature variation.

There is therefore a need for a machine for measuring optically the profile of a work-piece that can be realized more compactly than known devices. Furthermore there is a need of a profile-measuring machine that is less sensitive to the environment, in particular less sensitive to dirt, dust and aerosols. There is also a need for a profile-measuring machine that is easier to use and maintain than the devices known in the art A profile-measuring machine meeting some or all these goals could be advantageously adopted in many small or medium workshops that do not have the space or the resources for a metrology facility in a clean area. It is a goal of the present invention to propose such a machine.

BRIEF SUMMARY OF THE INVENTION

According to the invention, these aims are achieved by means of a device characterized by a rectilinear guide defining only one freedom of movement in translation of the measurement device, fastened on a reference support, on which are slideably engaged the optical stage and the tailstock, whereas a headstock is placed on a headstock carrier that is fastened on the reference surface and hangs at least in part over said rectilinear guide defining a second freedom of movement in rotation of the piece under measurement.

BRIEF DESCRIPTION OF THE DRAWINGS

The invention will be better understood with the aid of the description of an embodiment given by way of example and illustrated by the figures, in which:

FIG. 1b is partially exploded.

DETAILED DESCRIPTION OF POSSIBLE EMBODIMENTS OF THE INVENTION

Figure 1A:
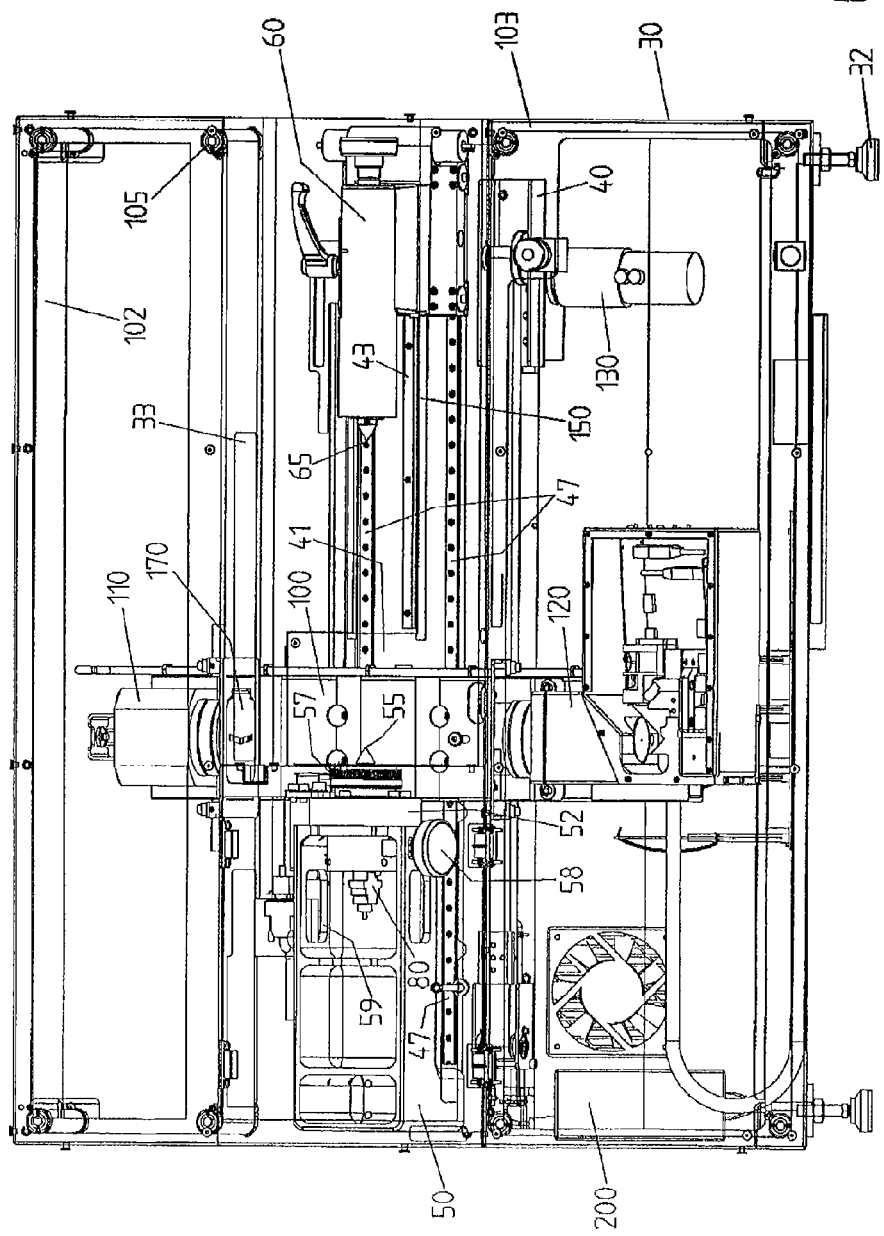
FIGS. 1a-1c shows a profile-measuring machine according to an aspect of the present invention, or parts thereof, in several views.
Figure 1B:
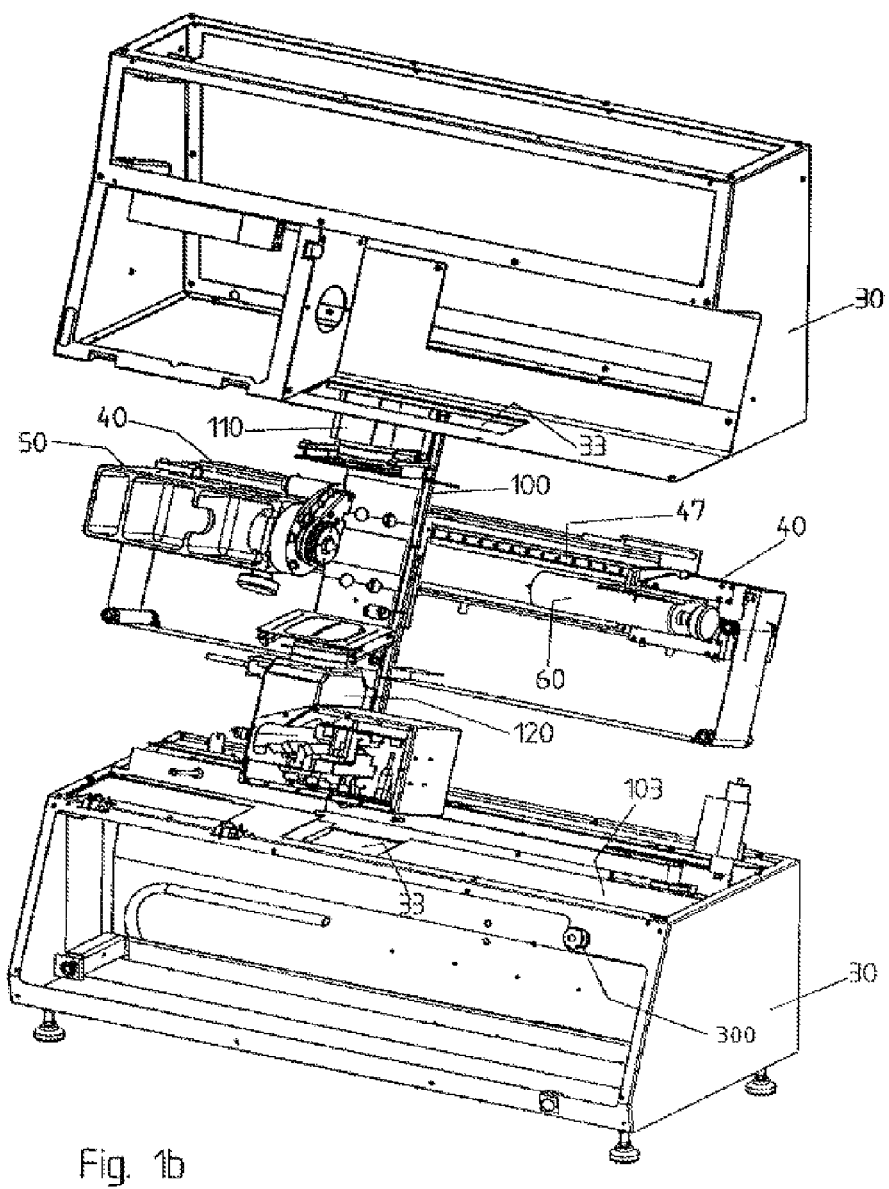
Figure 1C:
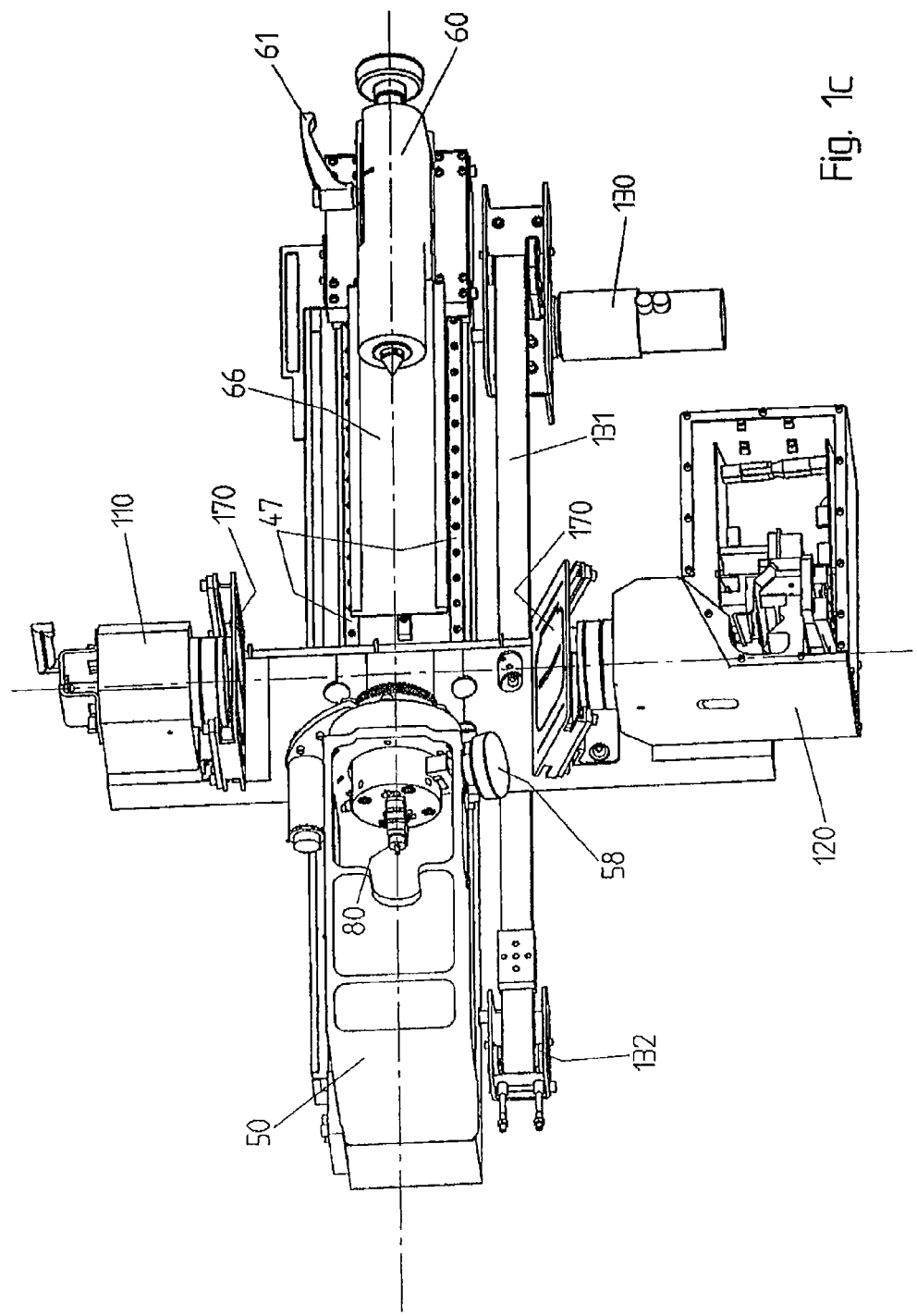

The profile-measurement machine represented in FIGS. 1a-1c includes a casing 30 resting on a suitable surface by the feet 32. The casing encloses and protects all the elements of the measuring machine, and in particular all the optical elements and the position encoders, as it will be seen more clearly in the following. The device of the invention can be realized as a bench-top or floor unit, according to the circumstances.

The machine of the invention further includes a reference support 40 providing a stable foundation to all the precision elements. The reference support 40 preferably has the shape of an elongated slab and presents a reference face 41, rectified very close to an ideal plane. The reference support is usually realised in granite, or a similarly hard and stable stone, but could also be made of a different material, steel for example.

The reference face 41 carries the rectilinear guides 47, in this case two straight parallel profiled steel rails fastened onto the reference face 41, providing a sliding support for the moving elements of the profile-measuring machine. The number of guides is not limited to two, but could vary according to the needs. The guides 47 define a rectilinear measuring main axis x that, ideally, is also parallel to the axis of the pieces that are measured.

The headstock holder 50 is also fastened on the reference face 41 of the support 40. Preferably the headstock holder 50 is fastened in a manner that allows its realignment as often as needed. In a preferred variant, the headstock holder is screwed on the reference support 40, and its position is finely set by interposing shims of various thicknesses. This is not however the only possibility.

The headstock holder is preferably L-shaped, as in FIGS. 1a-1c, or has a shape that overlaps at least partly the guides 47 in the direction of the main axis x. As it will be explained later, this disposition allows at least one sliding element to cross the plane of the headstock 52.

The headstock 52 is mounted on the overhanging end of the headstock holder 50 and, in this variant of the invention, comprises a centre point 55 that is intended to engage an end side of a lathed piece. Preferably, the centre point 55 is mounted on a rotary plate 57 driven by the motor 58 preferably a DCC motor and whose position is regulated and recorded by a suitable encoder (not represented). The rotary plate 57 allows the rotation of the work-piece and measure a profile at specific orientation.

Figure 2:
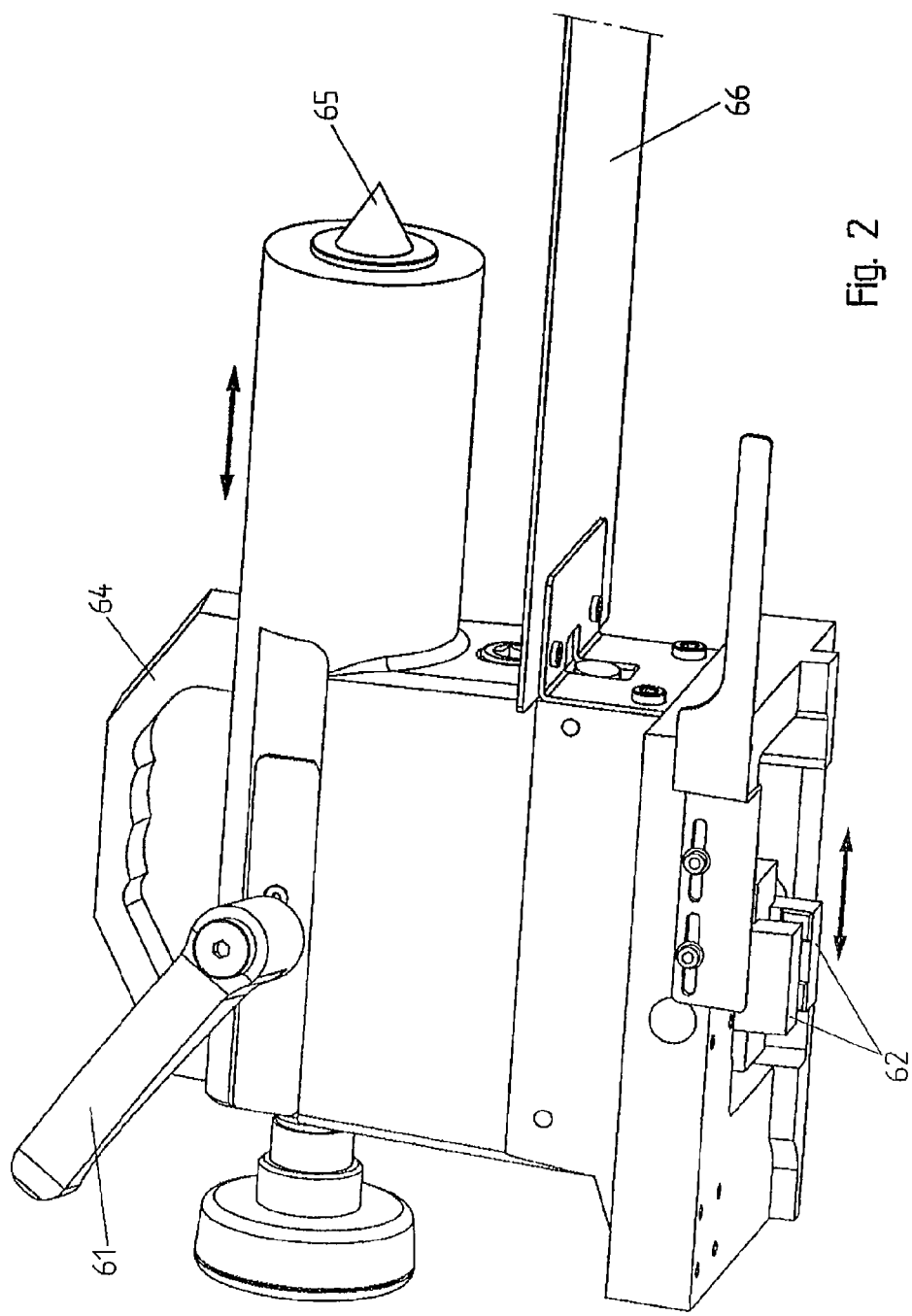
FIG. 2 illustrates a tailstock used to hold a piece in the profile-measuring apparatus used in a method of the invention.

The tailstock 60, visible in more detail in FIG. 2, is slideably mounted on the rails 47, preferably by of an isostatic mount that permits only a parallel movement along the x axis. This can be achieved, by three sliding pads. Preferably, the alignment of the tailstock 60 is adjustable between the pads and the tailstock center can be precisely aligned to the x axis.

The tailstock includes a release lever 61 acting on the jaws 62 that lock on the central rail 43 (visible in FIG. 1a), or an equivalent element on the support 40, according to the position of the lever 61. The tailstock carries preferably a conical centre point 65 in order to engage an end side of a lathed piece, in opposition to the centre point 55 that is on the headstock 50.

According to a preferred variant, the jaws 62, or another suitable locking element, are slideably mounted in the tailstock 60, and an elastic element in the tailstock (not visible) urges the jaws backwards. When the operator places the first piece to measure, he urges the handle 64 in direction of the piece under measurement and sets lever 61 is to close position, locking the jaws 62 on the central rail 43. The tailstock is elastically constrained forward (that is towards the headstock 50). The operator can move the tailstock 60 backwards by acting on the handle 64 without releasing the jaws 62, remove the piece under measurement and replace it with another, then release the handle 64, whereby the tailstock 60 returns elastically to the previously set position. In this manner, it is possible to measure a series of identical pieces without having to modify the tailstock position each time.

Referring to FIGS. 1a-1c again, the same rectilinear rails 47 on which is mounted the tailstock 60 are also used to guide a carriage 100, preferably also arranged on an isostatic mount that permits only a parallel movement along the x axis, for example by means of three or more sliding pads. The carriage 100 is mounted crosswise on the guides 47 and preferably with a small inclination from the vertical to avoid some dirt and dust to fall down directly on the optics and minimise the gravity deformation of the piece under measurement. The carriage includes a source of light 110 on the top side and an optical detector 120 on the bottom side. The electric motor 130, preferably a DCC motor regulated with an encoder, drives the carriage 100 along the x axis trough a belt 131 and by pulleys 132, or in any other suitable manner. The position of the optical carriage 100 is measured by a high-precision encoder, for example an optical encoder, including a rule 150 fixed on the reference surface 41 of support 40.

The source of light 110 includes components for directing a beam of collimated light across the x axis, to be interrupted by the piece under measurement. Preferably the beam of light is collimated in a narrow strip, in order to reduce diffused light, and is monochromatic to suppress chromatic aberration. Collimation can be obtained, for example, by slits 170. The optical detector 120 is aligned with the optical source 110 and arranged to receive the residual beam light that has not been interrupted by the piece under measurement, and direct it to an array of photo detectors, for example comprising one or more CCD linear arrays, whereby a transverse dimension of the piece can be determined at each position of the carriage 100 on the x axis.

Advantageously, the intensity of the luminous source 110 can be set to various predetermined levels, and the piece under measurement is examined repeatedly at different levels of illumination. This is useful to model and correct various sources of error, including diffraction, mirroring, and blur, applying known principles of optics.

Figure 3:
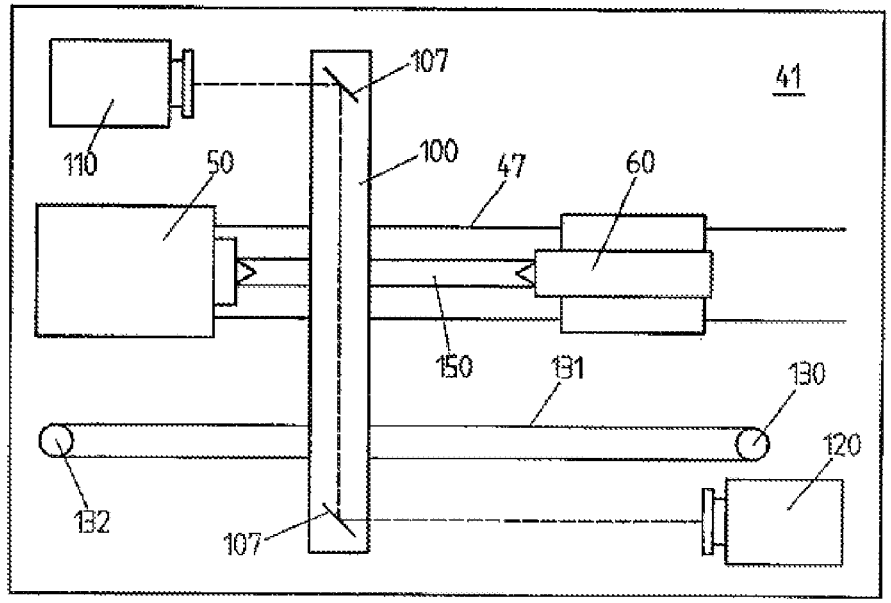
FIG. 3 shows schematically the apparatus of FIG. 2 with an alternative arrangement of the light source and of the optical detector.

In a variant of this invention, schematically represented in FIG. 3, the carriage 100 support only mirrors, for example the 45° mirrors 47, while the light source 110 and the detectors 120 are fixed on the fixed support 40. The collimated light beam is directed parallel to the x axis of the piece and with at least a first mirror is redirected in direction transverse to the piece to measure and then at least another mirror redirect the rest of light beam to the light detector. In this variant the carriage is very light, the mobility is better and faster and time-accuracy is enhanced. FIG. 3 represents a structure having the detector 120 and source 110 on opposite sides of the carriage 100, but it would also be possible to have them both on the same side of the carriage 100, by turning either of the mirrors 107 by 90°.

Figure 4:
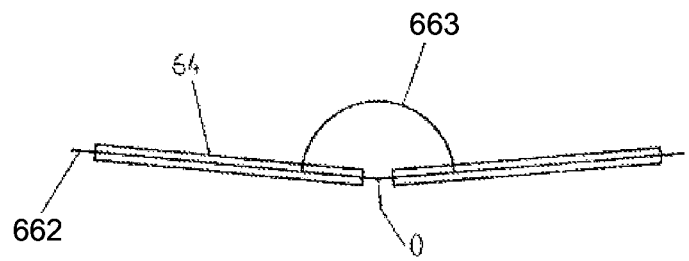
FIG. 4 shows schematically the profile of the luminous beam according to a preferred variant of the apparatus.

In a preferred embodiment, the light beam is a V-Shape light beam with an opening in direction of the displacement axis between 90° to 270° centred on the central axis of the piece, and the photo detectors are composed by a symmetric pair of angled CCD linear arrays, placed both side of the central axis of the piece to receive each two parts of the light beam. The photo detectors are arranged to measure with the same accuracy both side and with a common central point. The angled disposition of the CCD allows high resolution edge measurement. The outputs from the arrays are analyzed and interpolated to better than one pixel. This is illustrated schematically in FIG. 4, that shows the disposition of the CCD arrays 64 and a transverse section of the light beam 662, in a plane orthogonal to the optical axis O. The aperture angle 663 is of 165° or 170° in FIG. 4, which are typical values.

In a variant the light beam can be split in two light beams, one for each side edge of the piece under measurement, and then each of the two split beams part is redirected to a common CCD array. In this variant a shutter is used to cut off the split beams alternately, and one common light detector is used to measure both sides of the piece. This solution allows to spare one CCD detector, at the cost of a reduction in speed, because one single CCD array is used to read serially both sides of the piece.

The profile-measurement machine of the invention comprises a programmable processing unit 200 to drive the carriage 100 along the axis x, collect a series of measures from the optical detector 120, and reconstruct the profile of the piece under measurement.

The details of the optical devices used to collimate the light in the optical source 110 and to measure the residual light in the optical detector 120 can be found in patent EP0507566 that is hereby incorporated by reference, and will not be further developed. In particular in this invention the optics is reduced to the minimum to avoid optical aberrations and simplify the adjustment.

Preferably the machine of the invention includes a position sensor to detect the position of the carriage 100 relative to the tailstock 60 and relative to the headstock to avoid any collision, for example when the carriage comes close the tailstock the processing unit can slow down its motion. The processing unit is preferably programmed to stop driving the carriage with multiple steps with specific position signal, in order drive the scan as fast as possible regardless the length of the piece under measurement.

The machine include the programmable processing unit 200 to compute the results, a storing unit, a screen to show the result, an output to print out the results and permit to activate a sorting machine.

In a variant of this invention the machine can be integrated in a more complex production chain and the manipulation can be done by robots, in this case the loading and the releasing of the piece to measure can be activated by electromagnet system compressing the spring inside the tailstock as result it moves the tailstock 60 backward the headstock 50 releasing the piece.

According to one aspect of the invention, the programmable processing unit 200 includes a software program to realize an auto-measure function, also termed a "one-click" measure. The software can preferably be activated by a simple manual action, for example on a specially marked "auto-measure" button present on the machine, or a delay function given after positioning the piece under measurement, or a switch, or a pedal, or on a similarly marked element of a graphical user interface, without prior programming, which says to the machine the work-piece is ready to be measured, or a software-generated trigger condition. In a preferred variant, the "auto-measure" button is a multifunctional button used to initiate most or all of the measurements sequences, is labelled "Start", and is placed in a eminent position on the chassis of the measuring machine, for example the button 300 visible in FIG. 1b. When the auto-measure function is active the machine automatically scans the profile of the piece inserted between the centres 55 and 65 from end to end, and computes automatically the transverse dimensions dimension like diameters $d_1, d_2, \ldots$, the longitudinal dimensions $x_1, x_2, \ldots$ of the sections identified in the profile and the specific orientation $\theta_1, \theta_2, \ldots$ of the piece at the moment of the measure. The starting orientation is given at the placement of the piece in the machine. Optionally the program can rotate the piece as many times as needed, repeating each time the measure for each predefined orientation.

Each measured dimension can then be associated with it specific position and it specific orientation to construct the 3D representation of the piece under measurement. In a 2D representation, only the projection is needed, the orientation is not used.

Figure 5:
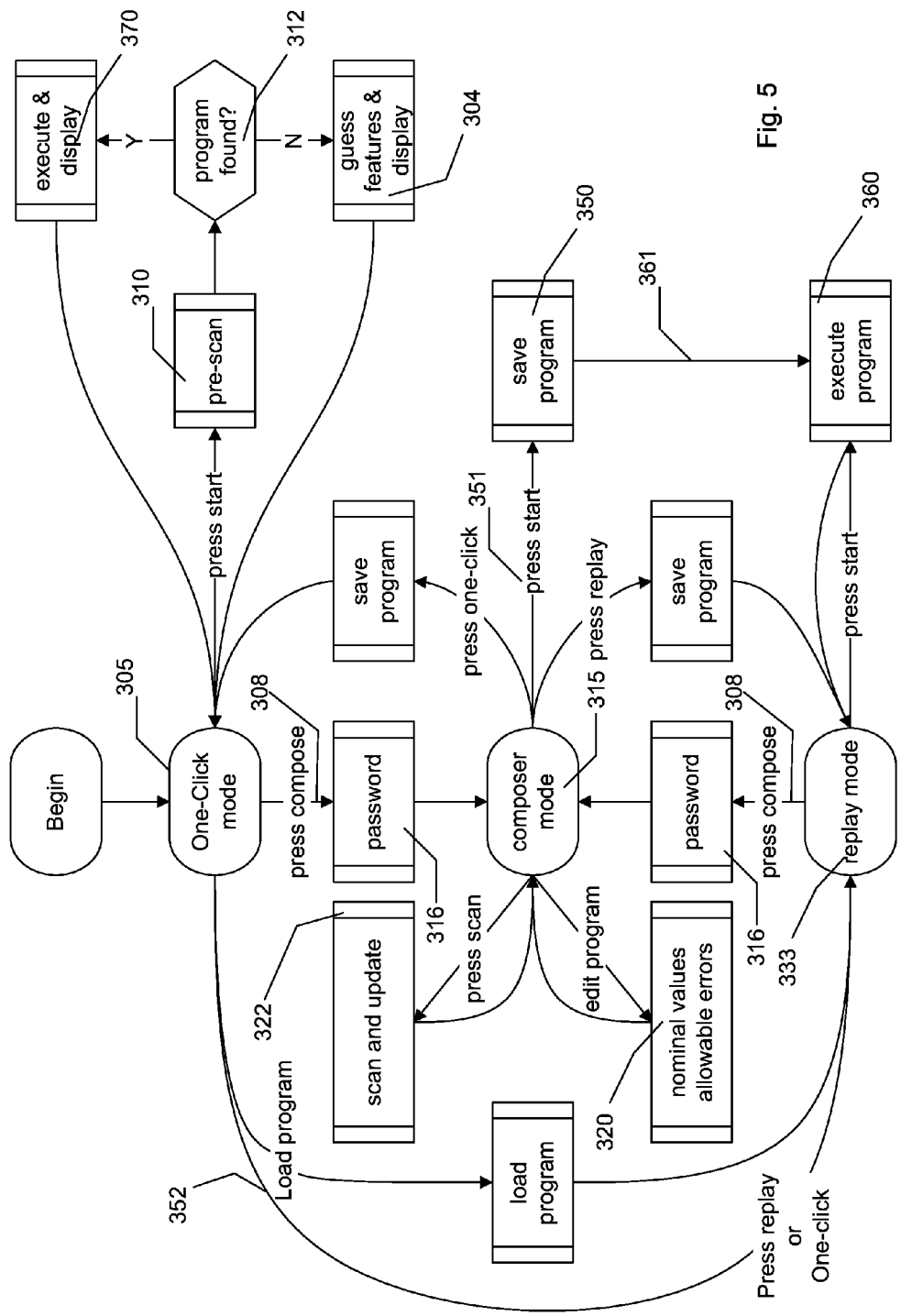
FIG. 5 illustrates schematically a method of measure according to an aspect of the present invention.

FIG. 5 shows a flowchart of a software program according to an aspect of the invention. The software includes a special one-click mode (box 305) and preferably other modes like the composer mode (box 315), used to create a measurement program, and/or a replay mode (box 333) used to test or repeat a pre-recorded measurement program.

After the initialization, the software is in the one-click mode (box 305). When the "start" button is pressed (arrow 308), the software start a pre-scan process 310 that drives the carriage 100 along the whole span comprises between the centres 55 and 65 in order to acquire a profile of whatever work-piece may be present and determine the best parameters and scanning speed to measure each region of interest, like edges, angles, or straight sections of the work-piece for example.

Preferably, the programmable processing unit is arranged to search in its memory if the result of the pre-scan corresponds to a profile of a work-piece already known and for which a program has been stored in memory (test 312) If the test is successful, the found program is executed, and the result reproduced on a display unit (box 370). Preferably, the auto-scan program includes a test to detect whether the pieces has been inserted with an inverted orientation in the measuring machine. In this case the processing unit warns about the operator and invites him to turn the piece in the right orientation for better accuracy result especially when all the length are needed to be accurate or, if this is acceptable for example when diameters are only needed, the processing unit inverts the program sequence to measure the piece in the inverted orientation.

In a variant the machine is able to reverse the scan direction when it detects a reverted work-piece at the pre-scan.

If the test 312 is not successful, the processing unit guesses the important features of the work-piece, for example localizes all straight sections and all the lateral steps, and computes and display diameters $d_1, d_2, \ldots$, and the length of the straight sections $L_1, L_2, \ldots$ of the sections identified in the profile. If appropriate, the program re-scans the work-piece adapting the scan parameters (speed, light intensity, acquisition rate etc.) to the results of the pre-scan.

The lateral speed displacement of the optics is calculated to produce a dimension variation measured as precise as possible. In large variation of dimension the sampling limit on the optical detector can be reach, and in this case the lateral speed is reduced to sample more points in a small region of displacement. Preferably the scanning speed is adaptively matched to the dimension variation slope.

After the measurement 304 the result can be displayed on a screen or printed without requiring any other action from the operator. To minimize operator action the process is entirely automated. When the measure is finished, the operator can substitute the piece under measurement and perform the next scan acting on the start button, for example.

Figure 6:
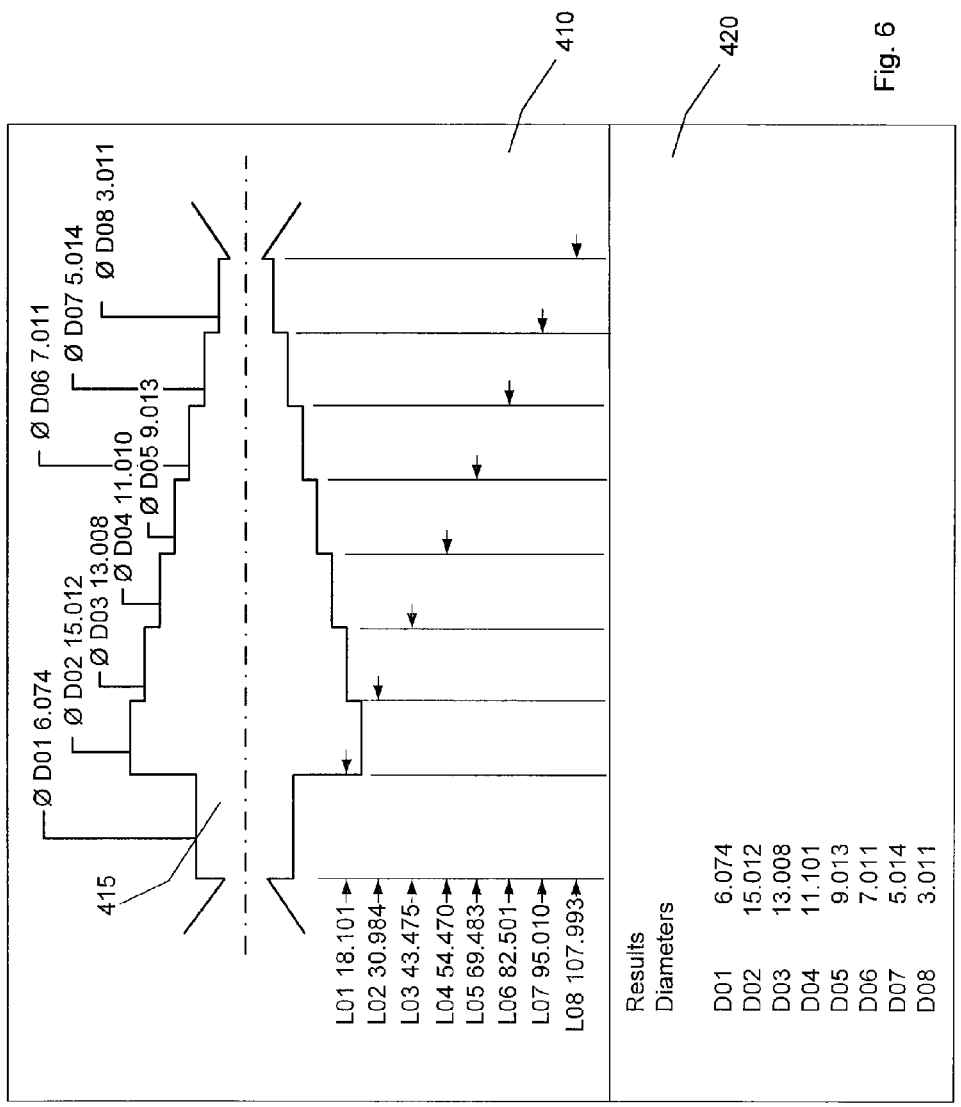
FIG. 6 shows schematically an output of a display during the execution of a step of the inventive method.

FIG. 6 shows a possible output of the measuring method of the invention, at the end of the one-click measurement 304. The upper part 410 of the display includes a graphical representation of the profile 415 of the work-piece, in which all the diameters and lengths that have been guessed (D01, D02, . . . ; L01, L02, . . . ) are represented as quotations. A lower part 420 of the display presents the measurements in tabular format. Other formats are however possible.

In another variant of this invention the auto-measure can evaluate the lateral speed needed and then in the region of interest the intensity of the light beam can be changed to reduce blurring effect and diffraction in some specific region.

In another variant of this invention the auto-measure can be a sequential program of successive operations in which we can find a preliminary scan (pre-scan) to determine the parameters and the regions of interest of the work-piece, and one or more detailed scans of the piece with different special scan conditions, according to the result of the pre-scan. In this variant the pre-scan is made firstly to create a reference. Detailed scans can be done as post operations in different region of interest, To test the roundness of a section of a piece, for example to, the carriage 100 is placed in correspondence of the region and the piece is rotated stepwise or continuously, while the transverse dimension is measured at various angles. In this variant the piece can be rotated repeatedly clockwise or counter clockwise with a predetermined angle to do more than one scan with different orientation of the work-piece. In this variant the region analysed in rotation can be compared with some other, to analyse for example common parallelism and/or cylindrical or concentricity constraints and then render the result like a 3D scanner.

According to another inventive aspect, the auto-measure mode is arranged to store the is able to store the measuring and analysis operation sequences corresponding to the features guessed in step 304 in a computer memory for further use or elaboration. Preferably, the auto-measure mode is also arranged to record the measured dimension in the computer memory for further use and documentation.

According to another variant, the auto-measure mode can be can be customized to select the features to be scanned, for example angles, roundness, or any other measurable dimension, and compute geometrical functions and statistical analysis.

The program can be used to analyse sampling of work-pieces and create analytical report or compute geometrical function from measured feature. It could be used to analyse production of piece, for example as a sampling of 10 pieces. Each measuring result can be store and recalled for analysis purpose, individually or grouped in the same file and permit further operations for analysis purpose. Automated operations can be done from one end to the other, for example for a predefined number of pieces, from the measure phase to the report of this sampling. Another advantage of this invention is the possibility to separate the tasks of the analysis from the task of the scan process, by the simplification of the scan process. The pre-scan profile is an imperfect image of the piece, to match the stored information it must match main dimensions of the scan profile known. In case of region with large variation of size the risk to find a lot of difference between the pre-scan and the stored profile is very heavy. In this case the program simplifies the dimensions to keep only repeatable dimensions which are viewed in large region to create a small mask image of the work-piece. The simplified mask image can further be compared with the stored profiles to find if there is any corresponding memorized program sequence.

Reverting now to FIG. 5, the software includes preferably a composer mode (box 315), arranged to create and/or modify specific programs for particular work-pieces. The composer mode is preferably password-protected (boxes 316) and is activated by acting on a specific "compose" button or icon (arrows 318). Box 320 corresponds to software resources arranged to define the dimension to be measured, their nominal values and allowable errors, and box 322 is used to test the program.

Pressing the "start" button from the composer mode (arrow 351) saves the program and enters into the replay mode (box 333). The replay mode can be activated also acting on a specific replay button or icon from the one-click mode (arrow 352). In the replay mode a loaded program is executed at each pressing of the "start" button (arrow 361 and box 360).

The saved and loaded programs can include specific instructions and measurements that may go beyond the possibilities of the one-click mode. In particular, saved program can include measures of angles, eccentricities, misalignments, and defects of roundness, and include preferably a check of the measured dimensions against their preset nominal values and allowable errors and display an indication of conformity, or lack thereof.

Figure 7:
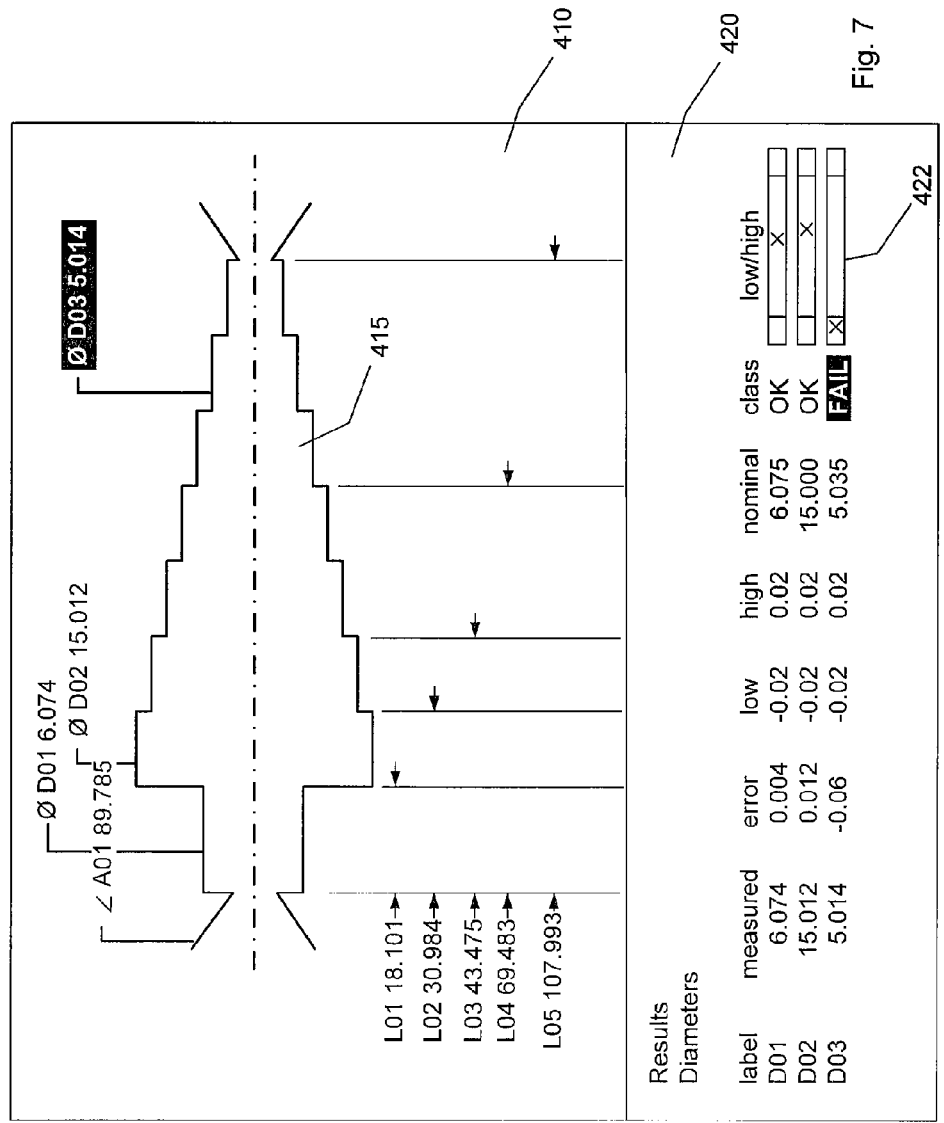
FIG. 7 shows schematically an output of a display unit during another step of optical measurement.

FIG. 7 is an example of a possible output of a program executed in replay mode. The upper part of the display 410 shows the measured profile with all the measures specified in the program, in graphical form. The example shows length measurements L01-L05, diameter measurements D01-D03, and an angle measurement A01. Other measurements are however possible. The diameter measurement D03 is out of the specified tolerance interval, and is preferably displayed in a different format, making it immediately recognizable, for example in a different font, colour or size.

The lower part of the display 420 shows the measured data in tabular form (in the figure only the diameters are represented, for simplicity's sake), together with the nominal values, the error, the tolerance interval, and a label of conformity or failure. In the example, the measure D03 is out of the specified tolerance, and this is indicated by the label fail, and the graphical display 422. The measuring machine preferably includes a calibration body 80 inside the headstock holder 50 that has openings 59 allowing the beam of light to traverse the headstock holder and measure the dimensions of the calibration body 80. The carriage 100 can be moved beyond the headstock 55 in alignment with the calibration body 80, because the headstock holder 50 hangs over and partially overlaps the guides 47. The calibration procedure is preferably automatic, under control of the processing unit 200. The calibration process is used at power on to align the CCD detector and the slope of points in the range of measurement. The calibration body consists of step edges. This calibration process avoids errors for temperature changes and is called "daily cal". This process can be repeated as often as needed, for example with a temperature sensor which detects temperature changes and triggers a new calibration process.

A measure of the calibration body at each measure can be done in a variant of this invention, but this is less accurate than the complete measure at the full calibration process. It is useful to do this, to analyse temperature changes between the measurements, normally one limits temperature changes by using conditioning room, so there is no need to do that measure each time.

In order to protect the light source 110 and the light detector 120 from dust and other matter that could deposit on the optical surfaces, these element are enclosed in the stationary casing 30 that has two elongated windows 33, having a major axis essentially parallel to the x axis, in order to allow the motion of the carriage 100 and the passage of the beam of collimated light. The flexible tapes 102 and 103 are connected in two loops closed loops around the rollers 105 and driven by the carriage 100. They close those parts of the elongated windows that are not in correspondence with the carriage 100 and limit the ingress of dust and particles in the casing 30.

The tailstock 60 also includes a protection tongue 66 that protects the guides 47 and the optical rule 150.

I claim:

1. An optical measuring apparatus, comprising
   a reference support on which a piece to be measured is mountable;
   an optical carriage movable in relation to said piece to be measured along a linear axis (x), said optical carriage carrying a light source for directing a beam of light across said x axis to be interrupted by the said piece under measurement;
   said carriage further carrying an optical detector aligned with said light source and arranged to receive the residual light of the said beam of light that has not been interrupted by said piece under measurement;
   a processing unit programmed to implement an auto-measure function, whereby the measuring apparatus is driven to automatically perform a pre-scan of said piece to be measured;
   the processing unit determines regions of interest in the piece and optimal scanning speeds and light intensity for said regions of interest; and the measuring apparatus is driven to perform a second scan of the piece after the pre-scan, the scanning speed and the light intensity in the second scan being adapted to values determined in the pre-scan and automatically compute transverse dimensions and longitudinal dimensions of said piece.

2. The optical measuring apparatus of claim 1, said piece to be measured being mountable between a fixed headstock, a movable tailstock opposed to the fixed headstock being maintained between said headstock and said tailstock in direction of said x axis.

3. The optical measuring apparatus according claim 2, wherein said headstock is driven in rotation by a motor to rotate said piece under measurement for exposing selectively the surface to be scanned by said beam of light, and wherein the processing unit is programmed to drive said motor and automatically compute said transverse dimensions and longitudinal dimensions for a plurality of angular orientations of said piece.

4. The optical measuring apparatus according to claim 1, wherein said processing unit is arranged to perform the pre-scan of said piece under measurement and record profile data, and computer process the profile data to determine the scanning speed of the second scan.

5. The optical measuring apparatus according to claim 4, wherein the processing unit is arranged to search a memory of stored programs and to determine whether a profile obtained in said pre-scan corresponds to one of said programs.

6. The optical measuring apparatus according to claim 4, wherein the processing unit is arranged to guess the features of the piece to be measured from a profile obtained in said pre-scan.

7. The optical measuring apparatus according to claim 1, wherein, in said auto-measure function, the processing unit is programmed to perform a preliminary scan of said piece under measurement and/or detect whether a piece under measurement has been inserted with a reverse orientation.

8. The optical measuring apparatus according to claim 1, wherein said beam of light consists of a collimated line of monochromatic light settable to a plurality of intensity levels.

9. Method of scanning a profile of a workpiece using a measuring apparatus, the method comprising the steps of:
positioning the workpiece between a fixed headstock, a movable tailstock opposed to the fixed headstock, the piece being maintained between said headstock and said tailstock in direction of a x axis;
moving an optical carriage which carries a light source and detector, in relation to said work piece to be measured along a linear axis,
using the light source to direct a beam of light across said x axis to be interrupted by the said work piece;
measuring residual light of the said beam of light that has not been interrupted by said piece under measurement;
performing a pre-scan of said workpiece obtaining a pre-scan profile, where the measuring apparatus is programmed to implement an auto-measure function, whereby the measuring apparatus is driven to automatically perform the pre-scan of said workpiece;
determining regions of interest in the piece and optimal scanning speeds and light intensity for said regions of interest;
search a memory of stored programs and to determine whether the pre-scan profile corresponds to one of said stored programs or guess the features of the piece to be measured from pre-scan profile;
measure and display the dimensions specified in said program or obtained from said guess; and
implementing an auto-measure function using a processing unit, whereby the measuring apparatus is driven to automatically scan the profile of said workpiece to be measured from end to end, and automatically compute the transverse dimensions and the longitudinal dimensions of all said work piece, wherein scanning the profile of said workpiece is performed with a second scan after the pre-scan at a second speed and light intensity that is adapted to values determined in the pre-scan.

10. The method of claim 9, wherein the method is triggerable by action on a single button or a software trigger without further manual operations.

11. The method of claim 10, wherein the automated program can be customized to select the features to be scanned, and compute geometrical functions and statistical analysis from said measured feature.

12. The method of claim 11, wherein the program is able to store in a computer memory measuring and analysis operation sequences in said automated program.

13. The method of claim 12, wherein the program is able to store in a computer memory measured results for further use.

14. An optical measuring apparatus, comprising
a reference support on which a piece to be measured is mountable;
an optical carriage movable in relation to said piece to be measured along a linear axis (x), said optical carriage carrying a light source for directing a beam of light across said x axis to be interrupted by the said piece under measurement;
said carriage further carrying an optical detector aligned with said light source and arranged to receive the residual light of the said beam of light that has not been interrupted by said piece under measurement;
a processing unit programmed to implement an auto-measure function, whereby the measuring apparatus is driven to automatically perform a pre-scan of said piece to be measured;
the processing unit determines regions of interest in the piece and scanning light intensity for said regions of interest; and
the measuring apparatus is driven to perform a second scan of the piece after the pre-scan, the scanning light intensity in the second scan being adapted to values determined in the pre-scan and automatically compute transverse dimensions and longitudinal dimensions of said piece.

15. The optical measuring apparatus according to claim 14, wherein said processing unit is arranged to perform the pre-scan of said piece under measurement and record profile data, and computer process the profile data to determine the scanning light intensity of the second scan.

16. The optical measuring apparatus according to claim 14, wherein the processing unit is arranged to search a memory of stored programs and to determine whether a profile obtained in said pre-scan corresponds to one of said programs.

17. The optical measuring apparatus according to claim 14, wherein said beam of light consists of a collimated line of monochromatic light settable to a plurality of intensity levels.

18. Method of scanning a profile of a workpiece using a measuring apparatus, the method comprising the steps of:
positioning the workpiece between a fixed headstock, a movable tailstock opposed to the fixed headstock, the piece being maintained between said headstock and said tailstock in direction of a x axis;
moving an optical carriage which carries a light source and detector, in relation to said work piece to be measured along a linear axis, using the light source to direct a beam of light across said x axis to be interrupted by the said work piece;

measuring residual light of the said beam of light that has not been interrupted by said piece under measurement;

performing a pre-scan of said workpiece obtaining a pre-scan profile, where the measuring apparatus is programmed to implement an auto-measure function, whereby the measuring apparatus is driven to automatically perform the pre-scan of said workpiece;

determining regions of interest in the piece and scanning light intensity for said regions of interest;

search a memory of stored programs and to determine whether the pre-scan profile corresponds to one of said stored programs or guess the features of the piece to be measured from pre-scan profile;

measure and display the dimensions specified in said program or obtained from said guess; and implementing an auto-measure function using a processing unit, whereby the measuring apparatus is driven to automatically scan the profile of said workpiece to be measured from end to end, and automatically compute the transverse dimensions and the longitudinal dimensions of all said work piece, wherein scanning the profile of said workpiece is performed with a second scan after the pre-scan at a scanning light intensity that is adapted to values determined in the pre-scan.

19. The optical measuring apparatus according to claim 18, comprising performing multiple scans at different levels of illumination.

20. The optical measuring apparatus according to claim 19, comprising selecting the scanning light intensity from the different levels of illumination.

* * * * *